(12) United States Patent
Schwindt et al.

(10) Patent No.: US 12,157,494 B2
(45) Date of Patent: Dec. 3, 2024

(54) USE OF HIGH DENSITY MAP IN OCCUPANCY GRID

(71) Applicant: Robert Bosch GmbH, Stuttgart (DE)

(72) Inventors: Oliver F. Schwindt, Sunnyvale, CA (US); Stephan Reuter, Bavaria (DE); Marcel Brueckner, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 18/064,057

(22) Filed: Dec. 9, 2022

(65) Prior Publication Data

US 2024/0190460 A1    Jun. 13, 2024

(51) Int. Cl.
*B60W 60/00* (2020.01)
*G06V 20/58* (2022.01)

(52) U.S. Cl.
CPC ............ *B60W 60/001* (2020.02); *G06V 20/58* (2022.01); *B60W 2420/403* (2013.01); *B60W 2420/408* (2024.01); *B60W 2554/4041* (2020.02); *B60W 2554/4049* (2020.02)

(58) Field of Classification Search
CPC ......... B60W 60/001; B60W 2420/403; B60W 2420/408; B60W 2554/4041; B60W 2554/4049; G06V 20/58
See application file for complete search history.

(56) References Cited

U.S. PATENT DOCUMENTS

| | | | |
|---|---|---|---|
| 9,996,944 B2 | 6/2018 | Aghamohammadi et al. | |
| 10,152,056 B2 | 12/2018 | Rohde et al. | |
| 10,296,001 B2 | 5/2019 | Smith et al. | |
| 10,445,928 B2 | 10/2019 | Nehmadi et al. | |
| 10,532,740 B2 | 1/2020 | Sorstedt et al. | |
| 10,955,855 B1 | 3/2021 | Tran | |
| 11,158,120 B1 | 10/2021 | Jespersen et al. | |
| 11,163,309 B2 | 11/2021 | Ta et al. | |
| 11,315,317 B2 | 4/2022 | Yu et al. | |
| 2018/0173232 A1 | 6/2018 | Schwindt et al. | |
| 2020/0209857 A1 | 7/2020 | Djuric et al. | |
| 2020/0225622 A1 | 7/2020 | Buerkle et al. | |

(Continued)

FOREIGN PATENT DOCUMENTS

| | | |
|---|---|---|
| DE | 102019129463 A1 | 5/2021 |
| DE | 102020119954 A1 | 2/2022 |

*Primary Examiner* — Yuen Wong

(74) *Attorney, Agent, or Firm* — Michael Best & Friedrich LLP

(57) ABSTRACT

Systems and methods for controlling an autonomous vehicle. One system includes an electronic processor and a memory configured to store an occupancy grid map. The occupancy grid map includes a set of cells associated with respective positions in an environment. A sensor is configured to output sensed occupancy information associated with positions in the environment. The electronic processor is configured to determine a position of the autonomous vehicle within the environment, and receive, from a server, a high density map. The high density map contains occupancy information. The electronic processor initializes the cells with occupancy information based on the high density map. The electronic processor confirms, based on the sensed occupancy information, a state of the set of the cells of the occupancy grid map, and controls vehicle movement based on the occupancy grid map.

20 Claims, 4 Drawing Sheets

(56) References Cited

U.S. PATENT DOCUMENTS

| | | |
|---|---|---|
| 2020/0249326 A1 | 8/2020 | Bhaskaran et al. |
| 2020/0283028 A1 | 9/2020 | Oba |
| 2020/0370920 A1 | 11/2020 | Ahmed et al. |
| 2021/0101624 A1 | 4/2021 | Philbin et al. |
| 2021/0131823 A1 | 5/2021 | Giorgio et al. |
| 2021/0323572 A1 | 10/2021 | He et al. |
| 2021/0342599 A1 | 11/2021 | Walls et al. |
| 2021/0347378 A1* | 11/2021 | Nabatchian ............ G06V 20/56 |
| 2022/0194412 A1 | 6/2022 | Zhang et al. |
| 2023/0145218 A1 | 5/2023 | Murray et al. |

* cited by examiner

USE OF HIGH DENSITY MAP IN OCCUPANCY GRID

FIELD

Embodiments, examples, and aspects described herein relate to, among other things, a system and method for autonomous vehicle control using high density maps.

SUMMARY

Autonomous vehicles and driver assistance functions often rely on occupancy grid maps storing probabilistic information relating to features of an environment in order to control vehicle movement in the environment. Occupancy grid maps are typically initialized to an unknown state and populated with data collected from sensors as the autonomous vehicle navigates the environment. Aspects disclosed herein provide systems and methods for initializing the cells of the occupancy grid map to an estimated state, rather than to an unknown state, using information included in high density maps to improve control of vehicle movement and navigation.

One example provides a system for an autonomous vehicle. The system includes a memory configured to store an occupancy grid map, wherein the occupancy grid map includes a set of cells associated with respective positions in an environment. The system also includes a sensor installed on the autonomous vehicle configured to output sensed occupancy information associated with positions in the environment. The system further includes an electronic processor configured to determine a position of the autonomous vehicle within the environment, receive, from a server, a high density map containing occupancy information, initialize a state of each cell of the set of cells of the occupancy grid map with occupancy information based on the high density map, such that each cell of the set of cells contains initialized occupancy information, confirm, based on the sensed occupancy information, a state of the set of cells of the occupancy grid map, and control vehicle movement based on the occupancy grid map.

In some instances, the electronic processor is configured to confirm the state of the set of cells of the occupancy grid map by comparing the initialized occupancy information of a cell with the sensed occupancy information, and in response to determining that the initialized occupancy information of a cell is different from the sensed occupancy information associated with a respective position, update the cell based on the sensed occupancy information.

In some instances, the electronic processor is configured to determine that a difference between the initialized occupancy information of a cell and the sensed occupancy information associated with the respective position is greater than a threshold, and transmit the sensed occupancy information to the server.

In some instances, the high density map includes occupancy information associated with static features of the environment, the static features including at least one selected from the group consisting of road markings, curbs, a type of ground surface, ground elevation, guard rails, under-drivable structures, sidewalks, and buildings.

In some instances, the sensor is at least one selected from the group consisting of a radar sensor, a LiDAR sensor, and a camera.

In some instances, the cells are voxels.

In some instances, the sensor is configured to detect a temporary obstacle in the environment, and the electronic processor is configured to transmit temporary obstacle information to the server, wherein the server is accessible by a second autonomous vehicle.

In some instances, the temporary obstacle information includes occupancy information associated with at least one selected from the group consisting of a parked vehicle, an available parking space, a construction site element, a trash can, and a snow mound.

In some instances, the temporary obstacle information includes a timestamp associated with the detection of the temporary obstacle.

In some instances, the temporary obstacle information associated with an available parking space includes information corresponding to an approximate size of the available parking space.

Another example includes a method for operating an autonomous vehicle. The method includes storing, in a memory, an occupancy grid map, wherein the occupancy grid map includes a set of cells associated with respective positions in an environment; outputting, with a sensor installed on the autonomous vehicle, sensed occupancy information associated with positions in the environment; determining, with an electronic processor, a position of the autonomous vehicle within the environment; receiving, from a server, a high density map containing occupancy information, initializing a state of each cell of the set of cells of the occupancy grid map with occupancy information based on the high density map, such that each cell of the set of cells contains initialized occupancy information, confirming, based on the sensed occupancy information, a state of the set of cells of the occupancy grid map, and controlling vehicle movement based on the occupancy grid map.

In some instances, the method includes confirming the state of the set of cells of the occupancy grid map by comparing the initialized occupancy information of a cell with the sensed occupancy information, and in response to determining that the initialized occupancy information of a cell is different from the sensed occupancy information associated with a respective position, updating the cell based on the sensed occupancy information.

In some instances, the method includes determining that a difference between the initialized occupancy information of a cell and the sensed occupancy information associated with the respective position is greater than a threshold, and transmitting the sensed occupancy information to the server.

In some instances, the high density map includes occupancy information associated with static features of the environment, the static features including at least one selected from the group consisting of road markings, curbs, a type of ground surface, ground elevation, guard rails, under-drivable structures, sidewalks, and buildings.

In some instances, the sensor is at least one selected from the group consisting of a radar sensor, a LiDAR sensor, and a camera.

In some instances, the cells are voxels.

In some instances, the method includes detecting, with the sensor, a temporary obstacle in the environment, and transmitting, with the electronic processor, temporary obstacle information to the server, wherein the server is accessible by a second autonomous vehicle.

In some instances, the temporary obstacle information includes occupancy information associated with at least one selected from the group consisting of a parked vehicle, an available parking space, a construction site element, a trash can, and a snow mound.

In some instances, the temporary obstacle information includes a timestamp associated with the detection of the temporary obstacle.

In some instances, the temporary obstacle information associated with an available parking space includes information corresponding to an approximate size of the available parking space.

DETAILED DESCRIPTION

Figure 1:
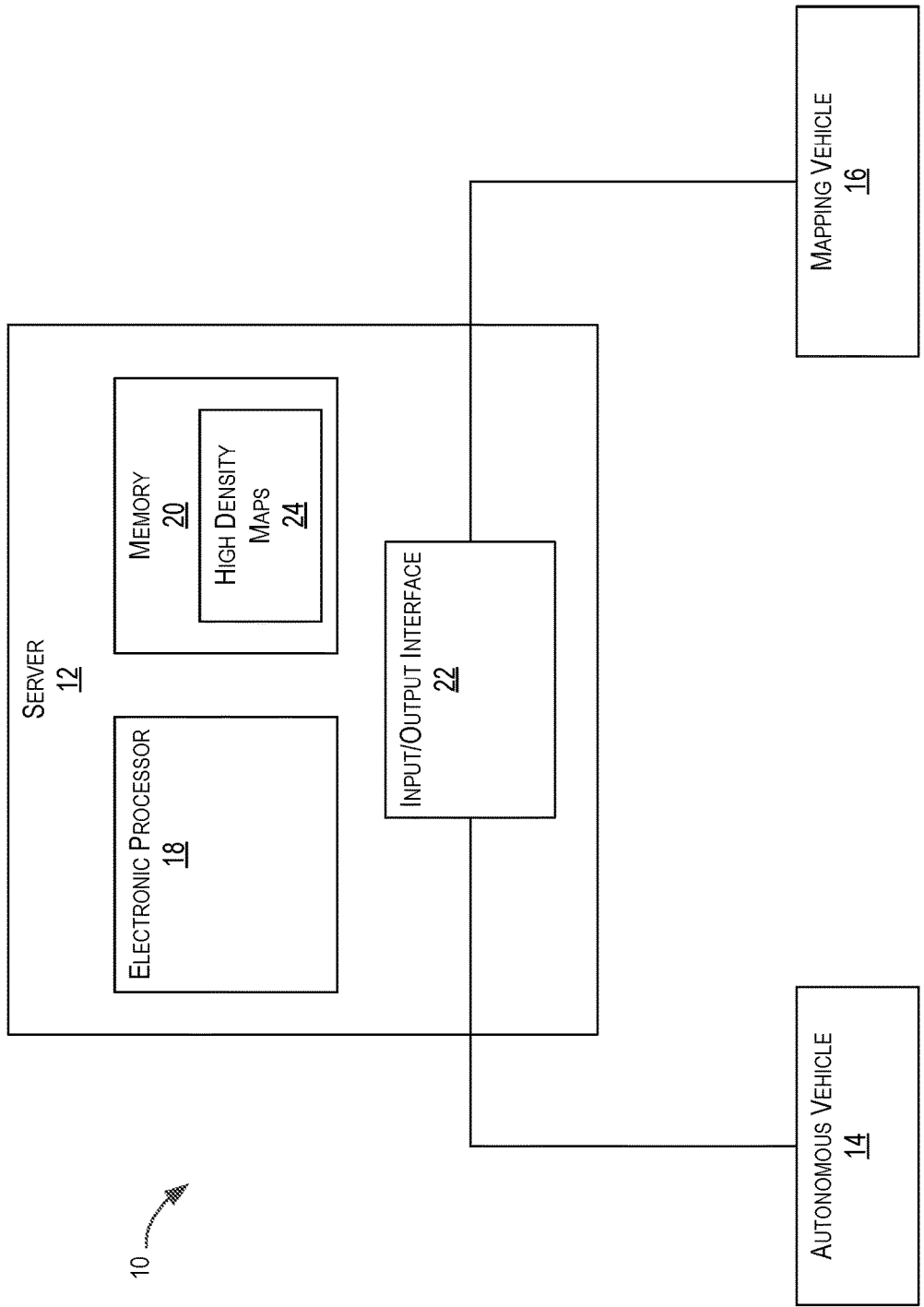
FIG. 1 illustrates a system for providing high density maps to an autonomous vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Autonomous vehicles and driver assistance functions often rely on occupancy grid maps storing probabilistic information relating to features of an environment in order to control vehicle movement in the environment. Occupancy grid maps include a set of cells associated with respective positions in the environment surrounding a vehicle. The cells, which may be 2D cells or 3D voxels, include occupancy information relating to static or dynamic features of the environment. Static features include, for example, road markings, guard rails, curbs, a type of ground surface, ground elevation, buildings, sidewalks, parked vehicles, construction site equipment, trash collection bins, and under-drivable structures (e.g., bridges). Dynamic features include, for example, pedestrians, moving vehicles, and animals. In some instances, the occupancy grid maps are multi-layer grid maps, wherein each layer stores information relating to a type of feature (for example, a first layer including ground surface information, a second layer including road marking information, a third layer including structural information).

The occupancy information may include sensor measurements of the features, occupancy probabilities of the corresponding positions in the environment, and free-space probabilities of corresponding positions in the environment. A state of each cell of the set of cells is typically initialized to an unknown state, and a degree of certainty that the cell is free or occupied is gradually incremented as one or more vehicle sensors detect and confirm the features of the environment.

Autonomous vehicles additionally may rely on high density maps generated during the mapping of driving routes. High density maps are high-precision maps used for planning routes traveled by autonomous vehicles. High density maps may include road elements (e.g., speed limits, lane types, lane direction information, lane boundaries), intersection elements, traffic signal elements, and static features of the environment that are unlikely to change over time (e.g., buildings, crosswalks, stop lines, street lights). High density maps are processed to extract a localized layout of a road, and may be transmitted to an autonomous vehicle from a server. These maps are often very large in size and require substantial processing resources.

FIG. 1 schematically illustrates a system 10 for providing high density maps to an autonomous vehicle. The term "autonomous vehicle" is used herein in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. The system 10 includes a server 12, an autonomous vehicle 14, and a mapping vehicle 16. Although illustrated as a single server 12, the system 10 may include multiple servers 12. The server 12 includes an electronic processor 18, a memory 20, and an input/output interface 22. The memory 20 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 18 is coupled to the memory 20 and the input/output interface 22. The electronic processor 18 sends and receives information (for example, from the memory 20 and/or the input/output interface 22) and processes the information by executing one or more software instructions or modules, capable of being stored in the memory 20, or another non-transitory computer readable medium. The electronic processor 18 may be one or more electronic processors.

The memory 20 includes one or more high density maps 24 for autonomous vehicle navigation. The high density maps 24 include high density information associated with the environment of a road. The high density maps 24 may include information from various sources (e.g., radar sensors, LiDAR sensors, cameras, satellite imagery, satellite-based positioning systems such as, for example, the Global Positioning System (GPS) or similar systems, or a combination thereof) to provide a high-precision representation of the environment. In some embodiments, the high density maps 24 are stored on disk or other form of non-volatile storage, wherein a portion of such maps 24 may be loaded into the memory 20 as needed by the server 12 to respond to map requests.

The high density maps 24 may be generated by the server 12 based on sensor data received from the mapping vehicle 16. The mapping vehicle 16 includes one or more sensors that collects environmental information while travelling on different roads. In some instances, high density maps are generated based on data collected from numerous devices, including, for example, multiple mapping vehicles 16. In some instances, high density maps are generated based on data collected from one or more autonomous vehicles 10.

Figure 2:
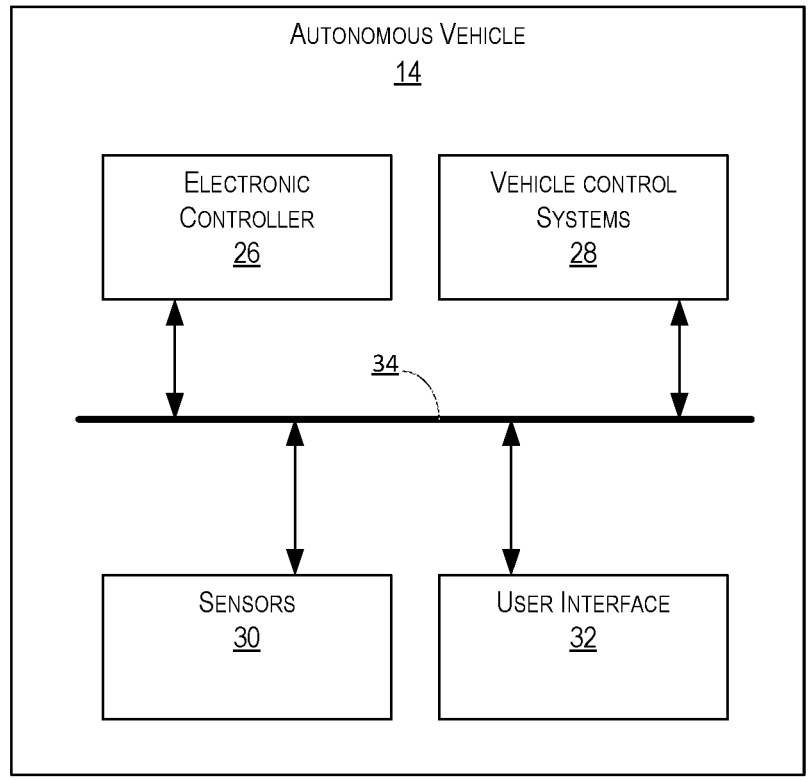
FIG. 2 illustrates an autonomous vehicle, according to some aspects.

FIG. 2 schematically illustrates the autonomous vehicle 14 according to some aspects. In the illustrated example, the autonomous vehicle 14 includes an electronic controller 26, vehicle control systems 28, a plurality of sensors 30 installed on the autonomous vehicle 14, and a user interface 32. The components of the autonomous vehicle 14, along with other various modules and components are electrically and communicatively coupled to each other via direct connections or by or through one or more control or data buses (for example, the bus 33 illustrated in FIG. 3), which enable communication therebetween. The use of control and data buses for the interconnection between, and communication among, the various modules and components would be known to a person skilled in the art in view of the invention described herein. In some instances, the bus 33 is a Controller Area Network (CAN™) bus. In some instances, the bus 33 is an automotive Ethernet™, a FlexRay™ communications bus, or another suitable bus. In alternative instances, some or all of the components of the autonomous vehicle 14 may be communicatively coupled using suitable wireless modalities (for example, Bluetooth™ or near field communication connections).

The electronic controller 26 (described in greater detail below with respect to FIG. 3) communicates with vehicle control systems 28 and the sensors 30. The electronic controller 26 may receive sensor data from the sensors 30 and determine control commands for the autonomous vehicle 14. The electronic controller 26 transmits the control commands to, among other things, the vehicle control systems 28 to operate or assist in operating the autonomous vehicle 14 (for example, by generating braking signals, acceleration signals, steering signals). In some instances, the electronic controller 26 is part of one or more vehicle controllers that implement autonomous or partially autonomous control of the autonomous vehicle 14.

The vehicle control systems 28 may include controllers, actuators, and the like for controlling aspects of the operation of the autonomous vehicle 14 (for example, acceleration, braking, shifting gears, and the like). The vehicle control systems 28 communicate with the electronic controller 26 via the bus 33.

The sensors 30 determine one or more attributes of the autonomous vehicle 14 and the environment around the autonomous vehicle 14 and communicate information regarding those attributes to the other components of the autonomous vehicle 14 using, for example, messages transmitted on the bus 33. The sensors 30 may include, for example, vehicle control sensors (for example, sensors that detect accelerator pedal position and brake pedal position, wheel speed sensors, vehicle speed sensors, yaw, pitch, and roll sensors, force sensors, and vehicle proximity sensors (for example, ultrasonic). In some instances, the sensors 30 include one or more cameras or other imaging devices configured to capture one or more images of the environment surrounding the autonomous vehicle 14. Radar and LiDAR sensors may also be used.

In some instances, the electronic controller 26 controls aspects of the autonomous vehicle 14 based on commands received from the user interface 32. The user interface 32 provides an interface between the components of the autonomous vehicle 14 and an occupant (for example, a driver) of the autonomous vehicle 14. The user interface 32 is configured to receive input from the driver, receive indications of vehicle status from the system's controllers (for example, the electronic controller 26), and provide information to the driver based on the received indications. The user interface 32 provides visual output, such as, for example, graphical indicators (for example, fixed or animated icons), lights, colors, text, images, combinations of the foregoing, and the like. The user interface 32 includes a suitable display mechanism for displaying the visual output, such as, for example, a liquid crystal display (LCD) touch screen, or an organic light-emitting diode (OLED) touch screen), or other suitable mechanisms. In some instances, the user interface 32 displays a graphical user interface (GUI) (for example, generated by the electronic controller 26 and presented on a display screen) that enables a driver or passenger to interact with the autonomous vehicle 14. The user interface 32 may also provide audio output to the driver via a chime, buzzer, speaker, or other suitable device included in the user interface 32 or separate from the user interface 32. In some instances, user interface 32 provides haptic outputs to the driver by vibrating one or more vehicle components (for example, the vehicle's steering wheel and the seats), for example, using a vibration motor. In some instances, user interface 32 provides a combination of visual, audio, and haptic outputs.

Figure 3:
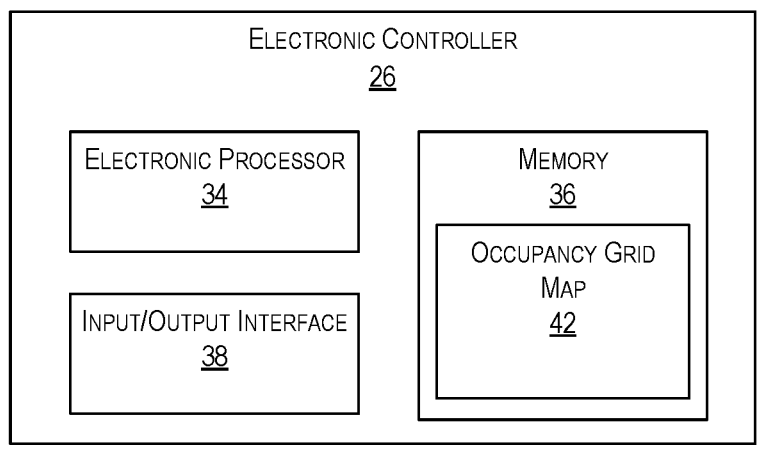
FIG. 3 illustrates an electronic controller for an autonomous vehicle, according to some aspects.

FIG. 3 illustrates an example of the electronic controller 26, which includes an electronic processor 34 (for example, a microprocessor, application specific integrated circuit, etc.), a memory 36, and an input/output interface 38. The memory 36 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 34 is coupled to the memory 36 and the input/output interface 38. The electronic processor 34 sends and receives information (for example, from the memory 36 and/or the input/output interface 38) and processes the information by executing one or more software instructions or modules, capable of being stored in the memory 36, or another non-transitory computer readable medium. The software can include firmware, one or more applications, program data, filters, rules, one or more program modules, and other executable instructions. The electronic processor 34 is configured to retrieve from the memory 36 and execute, among other things, software for performing methods as described herein. In the example illustrated, the memory 36 stores, among other things an occupancy grid map 42 for storing occupancy information relating to static and dynamic features of the environment. In some instances, the memory 36 stores a plurality of occupancy grid maps 42. The input/output interface 38 transmits and receives information from devices external to the electronic controller 26 (for example, components of the autonomous vehicle 14 via the bus 33). It should be understood that the electronic controller 16 may include additional components than those illustrated in FIG. 3 and in various configurations. For example, in some examples, the electronic controller 16 includes multiple electronic processors 34, multiple memory modules 36, multiple input/output interfaces 38, or a combination thereof.

Figure 4:
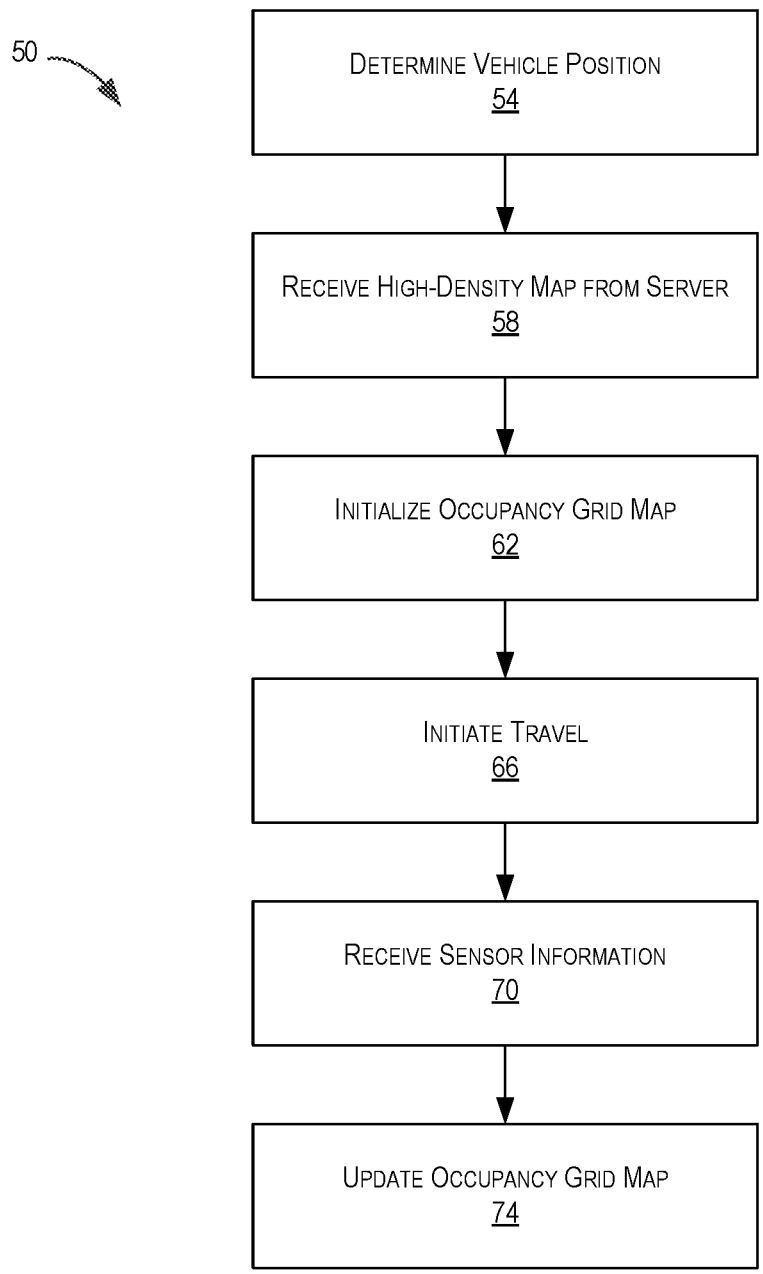
FIG. 4 illustrates an example method for controlling an autonomous vehicle, according to some aspects.

FIG. 4 is a flowchart illustrating an example method 50 for controlling the autonomous vehicle 14. Some of the method blocks of the method 50 are described herein with reference to the electronic processor 34, however, these blocks may be implemented in the autonomous vehicle 14 in any appropriate matter. In some instances, the operations are implemented in a distributed manner such that individual sensors, electronic processors, or a combination thereof used in the autonomous vehicle 14 may be configured to process occupancy information to collectively initialize and update the occupancy grid map 42. It should be understood that in some instances a "sensor" includes both sensing components and processing components (for example, a microprocessor) and, as a consequence, the sensor processes raw information or data and generates determinations. In general, whenever the term "sensor" is used it should be understood that the sensor may include both sensing and processing components and may be configured to generate data in particular formats, determinations regarding sensed phenomena, or other processed outputs.

Each block in the method 50 is illustrated once each and in a particular order, however, the blocks of the method 50 may be reordered and repeated as appropriate. Additionally, any operations in the method 50 may be performed in parallel with each other as appropriate and as desired.

At block 54, the electronic processor 34 determines a position of the autonomous vehicle 14 in the environment. The electronic processor 34 may use, for example, GPS or other localization means to determine the location and orientation of the autonomous vehicle 14 as it moves through the environment. At block 58, the electronic processor 34 receives from the server 12, via the input/output interface 38 of the autonomous vehicle 14 and the input/output interface 22 of the server a high density map 24. In some instances, the electronic processor 34 receives a processed portion of the high density map 24 based on the determined position of the autonomous vehicle 14. The autonomous vehicle 14 may send a periodic request to the server 12 for an portion of the high density map 24. The autonomous vehicle 14 may request a portion of the high density map based on the determined location of the autonomous vehicle 14, based on a period of time since the autonomous vehicle 14 received a portion of the high density map 24, or a combination thereof. As the autonomous vehicle 14 travels through the environment, the electronic processor 34 may repeatedly determine the location of the autonomous vehicle 14, and repeatedly receive portions of the high density map 24 based on the determined locations.

At block 62, in response to receiving the high density map 24, the electronic processor 34 initializes one or more cells of the occupancy grid map 42 with occupancy information based on the high density map 24, such that one or more cells of the occupancy grid map 42 contain initialized occupancy information. In some embodiments, the electronic processor 34 may initialize each cell of the occupancy grid map 42. In other embodiments, the electronic processor 34 may only initialize a subset of the cells. In some embodiments, the electronic processor 34 initializes one or more cells of the occupancy grid map 42 with occupancy information representative of previously known features of the environment that are unlikely to change over time in order to generate an estimation of the current features environment. As an example, the high density map 24 may include occupancy information indicating the location of a guard rail along a road. Based on this information in the map 24, the electronic processor 34 may initialize one or more cells of the occupancy grid map 42 associated with the respective location of the guard rail in the environment with an occupancy probability indicative that the respective locations are likely occupied, as well as other occupancy information relating to the feature of the environment (for example, the shape of the feature, an identification of the feature, a purpose of the feature). Initializing one or more cells of the occupancy grid map 42 enables the autonomous vehicle 14 to navigate the environment more accurately before vehicle sensors 30 have detected the current features of the environment or as vehicle sensors 30 are processing measurements.

In some instances, the electronic processor 34 initializes an occupancy probability for a cell to a numeric value representing a likelihood that a position represented by the cell is free or occupied (for example, a value within a range of 0 to 1). As the electronic processor 34 determines, with an increased confidence, that the position is free or occupied, the electronic processor 34 may update the occupancy probability to a value closer to a respective end of the range. For example, an occupancy probability of 1 may indicate a high confidence that the position is occupied, and an occupancy probability of 0.7 may indicate a moderate confidence that the position is occupied. An occupancy probability of 0 may indicate a high confidence that the position is free, and an occupancy probability of 0.3 may indicate a moderate confidence that the position is free. An occupancy probability of 0.5 may indicate a low confidence that the position is either free or occupied. The occupancy probabilities are not limited to numerical values between 0 and 1, and may be, for example, percentages, other numerical ranges, or other representations of probability. In some instances, the cells include both occupancy probability values and free-space probability values.

At block 66, the autonomous vehicle 14 travels through the environment, and, as the autonomous vehicle 14 moves through the environment, the electronic processor 34 receives sensor information from the vehicle sensors 30 (at block 70). The sensor information includes sensed occupancy information associated with positions in the environment surrounding the autonomous vehicle 14. In some instances, the sensed occupancy information is processed by the respective sensors 30 before the electronic processor 34 receives the sensed occupancy information.

At block 74, the electronic processor 34 updates the occupancy grid map 42 based on the sensed occupancy information received from the sensors 30 and controls movement of the autonomous vehicle 14 based on the update. The electronic processor 34 updates the occupancy grid map 42 by, for example, comparing the initialized occupancy information associated with positions in the environment with the sensed occupancy information associated with the respective positions in the environment. In response to determining, based on the sensed occupancy information, that the initialized occupancy information is an accurate representative of the current environment, the electronic processor 34 updates the occupancy probability of the cells in accordance with an increased level of confidence that the cells are free or occupied. In contrast, in response to determining that the initialized occupancy information of a cell is different from the sensed occupancy information, the electronic processor 34 updates the cell based on the sensed occupancy information. For example, the sensed occupancy information may indicate that a temporary static obstacle, such as a trash collection bin or a parked vehicle, is on the roadway, and the electronic processor 34 may increase the occupancy probability, decrease the free-space probability, or both of one or more cells representing the area occupied by the detected temporary static obstacle. The electronic processor 34 may also store information regarding the detected temporary static obstacle in the one or more cells, such as, for example, a size, a shape, or both of the detected obstacle. As the detected obstacle was classified as being a "temporary" obstacle, the electronic processor 34 may also store timing information indicating when the obstacle was detected, which the electronic processor 34 may use to determine when the information regarding the detected temporary static obstacle may be considered outdated and, hence, not usable.

The occupancy information of the cells may also include confirmation information (for example, a flag or a list) indicating that the state of the cell was confirmed by the sensors 30. In some instances, the confirmation information includes a timestamp associated with a confirmation of the occupancy information, a modality of the particular sensor that detected and confirmed the occupancy information, or a number of sensors that detected and confirmed the occupancy information. In some instances, the electronic processor 34 updates the occupancy probabilities (or free-space probabilities) of the cells based on the confirmation information.

In some instances, the electronic processor 34 determines whether the difference between the initialized occupancy information of a cell or cells (based on the high density map 24) and the sensed occupancy information associated with the respective position in the environment is greater than a threshold. For example, the sensed occupancy information may indicate that the layout of the road has changed. In such instances, in response to the difference being greater than the threshold, the electronic processor 34 may transmit the sensed occupancy information to the server 12. In response to receiving sensed occupancy information indicative of a significant change in the environment, the server 12 may update one or more high density maps 24 based on the sensed occupancy information. In some embodiments, the electronic processor 34 may apply different thresholds based on a type of feature. For example, the electronic processor 34 may apply a smaller threshold for detected differences in road layout (to ensure that the server 12 is updated with current road information) and may apply a larger threshold for detected differences between road signs and signals, road surfaces, or the like.

In some instances, the sensors 30, together with the electronic processor 34, detect and identify particular types of temporary obstacles in the environment and transmit temporary obstacle information associated with the temporary obstacles to the server 12. The temporary obstacle information may include, for example, information associated with a parked vehicle, an available parking space, a construction site element, a snow mound, a trash can, a parked emergency service vehicle, or other detected object that will likely change shape, position, or existence in the future. The temporary obstacle information may also include a timestamp associated with the time of detection of the temporary obstacle. The server 12 may provide the temporary obstacle information to a second autonomous vehicle as part of a high density map 24 or as separate information. For example, the second autonomous vehicle may receive, from the server 12, temporary obstacle information associated with an available parking space near a destination of travel. The temporary obstacle information associated with an available parking space may further include information corresponding to an approximate size of the available parking space and parking enforcement information associated with the parking space. The electronic processor 34 may retain the temporary obstacle information for a predetermined period of time based on the timestamp and discard the temporary obstacle information after the predetermined period of time has lapsed.

Figure 5:
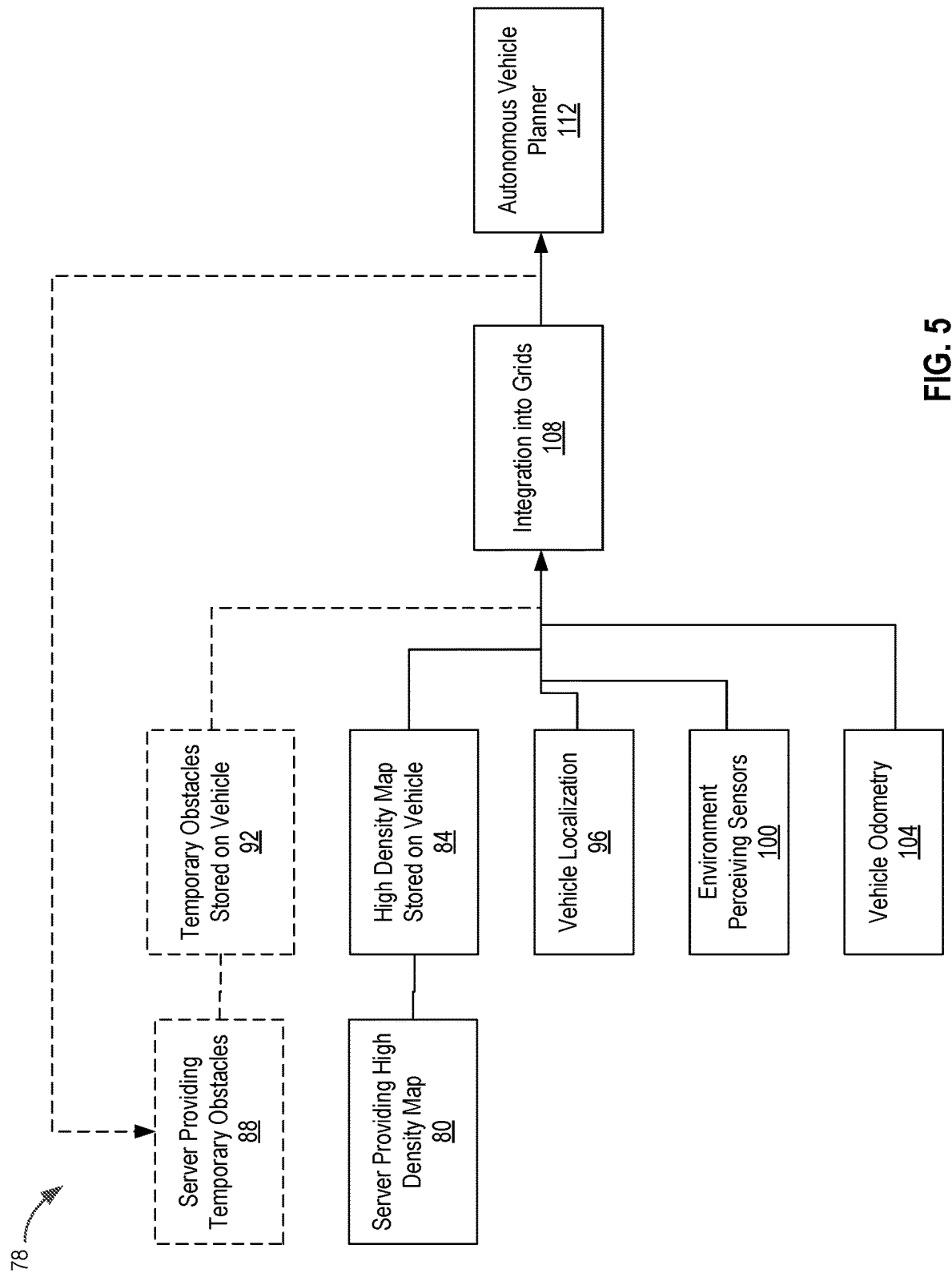
FIG. 5 illustrates an additional example method for controlling an autonomous vehicle, according to some aspects.

For example, FIG. 5 illustrates a second example method 78 for controlling the autonomous vehicle 14 using temporary obstacle information. Each block in the second example method 78 is illustrated once each and in a particular order, however, the blocks of the second example method 78 may be reordered and repeated as appropriate. Additionally, any operations in the second example method 78 may be performed in parallel with each other as appropriate and as desired.

At block 80, the server 12 transmits a high density map 24 to the autonomous vehicle 14. At block 84, the autonomous vehicle 14 receives and stores the high density map 24 in the memory 36. In some instances, at block 88 the server 12 transmits temporary obstacle information to the autonomous vehicle 14. At block 92, the autonomous vehicle 14 receives and stores the temporary obstacle information in the memory 36. At block 96, the electronic processor 34 performs localization of the autonomous vehicle 14 to determine the position and orientation of the autonomous vehicle 14 in an environment. At block 100, the sensors 30 detect features of the environment, and output sensed occupancy information to the electronic processor 34. At block 104, the electronic processor receives odometry information from an odometer in the autonomous vehicle 14. The odometry information may be used for vehicle localization or processing of sensed occupancy information as the vehicle travels. At block 108, the electronic processor 34 integrates inputs including the temporary obstacle information, information from the high density map 24, vehicle localization information, sensed occupancy information, vehicle odometry information, or a combination thereof into one or more occupancy grid maps 42. The electronic processor 34 may process some or all of the inputs to the occupancy grid map 42. For example, the electronic processor 34 may time-filter (for example, using a Kalman filter) the inputs or spatially transform the inputs prior to integration into the occupancy grip map 42. At block 112, the electronic processor 34 controls route planning, navigation, movement of the autonomous vehicle 14, or a combination thereof, such as, for example, via the vehicle control systems 28, based on the occupancy grip map 42.

In some aspects, an occupancy map is limited in range. For example, in some examples, an occupancy map is limited to an area generally aligned with a range of sensors onboard the vehicle. Without such limiting, memory required to store an occupancy map may be too large. Accordingly, it should be understood that the steps described above relating to updating an occupancy map with sensor data and using high density map data to update the "new" cells performed cyclically or iteratively.

Thus, aspects herein provide systems and methods for using high density maps in occupancy grids.

What is claimed is:

1. A system for an autonomous vehicle, the system comprising:
   a memory configured to store an occupancy grid map, wherein the occupancy grid map includes a set of cells associated with respective positions in an environment;
   a sensor installed on the autonomous vehicle configured to output sensed occupancy information associated with positions in the environment;
   an electronic processor configured to:
      determine a position of the autonomous vehicle within the environment,
      receive, from a server, a high density map containing occupancy information,
      initialize a state of each cell of the set of cells of the occupancy grid map with occupancy information based on the high density map, such that each cell of the set of cells contains initialized occupancy information,
      confirm, based on the sensed occupancy information, a state of the set of cells of the occupancy grid map,
      update the occupancy grid map based on the confirmed state of the set of cells, and
      control at least one of acceleration, braking, and shifting gears of the autonomous vehicle based on the updated occupancy grid map.

2. The system for the autonomous vehicle of claim 1, wherein the electronic processor is configured to
   confirm the state of the set of cells of the occupancy grid map by comparing the initialized occupancy information of a cell with the sensed occupancy information, and
   in response to determining that the initialized occupancy information of a cell is different from the sensed occupancy information associated with a respective position, update the cell based on the sensed occupancy information.

3. The system for the autonomous vehicle of claim 2, wherein the electronic processor is configured to
determine that a difference between the initialized occupancy information of a cell and the sensed occupancy information associated with the respective position is greater than a threshold, and
transmit the sensed occupancy information to the server.

4. The system for the autonomous vehicle of claim 1, wherein the high density map includes occupancy information associated with static features of the environment, the static features including at least one selected from the group consisting of road markings, curbs, a type of ground surface, ground elevation, guard rails, under-drivable structures, sidewalks, and buildings.

5. The system for the autonomous vehicle of claim 1, wherein the sensor is at least one selected from the group consisting of a radar sensor, a LIDAR sensor, and a camera.

6. The system for the autonomous vehicle of claim 1, wherein the cells are voxels.

7. The system for the autonomous vehicle of claim 1, wherein
   the sensor is configured to detect a temporary obstacle in the environment, and
   the electronic processor is configured to transmit temporary obstacle information to the server, wherein the server is accessible by a second autonomous vehicle.

8. The system for the autonomous vehicle of claim 7, wherein the temporary obstacle information includes occupancy information associated with at least one selected from the group consisting of a parked vehicle, an available parking space, a construction site element, a trash can, and a snow mound.

9. The system for the autonomous vehicle of claim 7, wherein the temporary obstacle information includes a timestamp associated with the detection of the temporary obstacle.

10. The system for the autonomous vehicle of claim 8, wherein the temporary obstacle information associated with the available parking space includes information corresponding to an approximate size of the available parking space.

11. A method for operating an autonomous vehicle, the method comprising:
   storing, in a memory, an occupancy grid map, wherein the occupancy grid map includes a set of cells associated with respective positions in an environment;
   outputting, with a sensor installed on the autonomous vehicle, sensed occupancy information associated with positions in the environment;
   determining, with an electronic processor, a position of the autonomous vehicle within the environment;
   receiving, from a server, a high density map containing occupancy information,
   initializing a state of each cell of the set of cells of the occupancy grid map with occupancy information based on the high density map, such that each cell of the set of cells contains initialized occupancy information,
   confirming, based on the sensed occupancy information, a state of the set of cells of the occupancy grid map,
   updating the occupancy grid map based on the confirmed state of the set of cells, and
   controlling at least one of acceleration, braking, and shifting gears of the autonomous vehicle based on the updated occupancy grid map.

12. The method of claim 11, further comprising
   confirming the state of the set of cells of the occupancy grid map by comparing the initialized occupancy information of a cell with the sensed occupancy information, and in response to determining that the initialized occupancy information of a cell is different from the sensed occupancy information associated with a respective position, updating the cell based on the sensed occupancy information.

13. The method of claim 12, further comprising:
determining that a difference between the initialized occupancy information of a cell and the sensed occupancy information associated with the respective position is greater than a threshold, and
transmitting the sensed occupancy information to the server.

14. The method of claim 11, wherein the high density map includes occupancy information associated with static features of the environment, the static features including at least one selected from the group consisting of road markings, curbs, a type of ground surface, ground elevation, guard rails, under-drivable structures, sidewalks, and buildings.

15. The method of claim 11, wherein the sensor is at least one selected from the group consisting of a radar sensor, a LIDAR sensor, and a camera.

16. The method of claim 11, wherein the cells are voxels.

17. The method of claim 11, further comprising:
detecting, with the sensor, a temporary obstacle in the environment, and
transmitting, with the electronic processor, temporary obstacle information to the server, wherein the server is accessible by a second autonomous vehicle.

18. The method of claim 17, wherein the temporary obstacle information includes occupancy information associated with at least one selected from the group consisting of a parked vehicle, an available parking space, a construction site element, a trash can, and a snow mound.

19. The method of claim 17, wherein the temporary obstacle information includes a timestamp associated with the detection of the temporary obstacle.

20. The method of claim 18, wherein the temporary obstacle information associated with the available parking space includes information corresponding to an approximate size of the available parking space.

* * * * *